March 29, 1927.
J. B. ANNIS
1,622,481
DEVICE FOR MEASURING THE LUBRICATING VALUE OF OIL
Filed Aug. 3, 1925   2 Sheets-Sheet 1
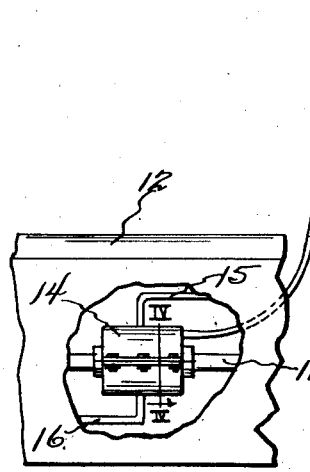
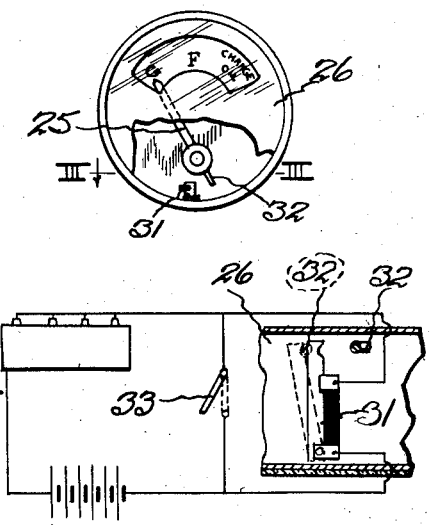
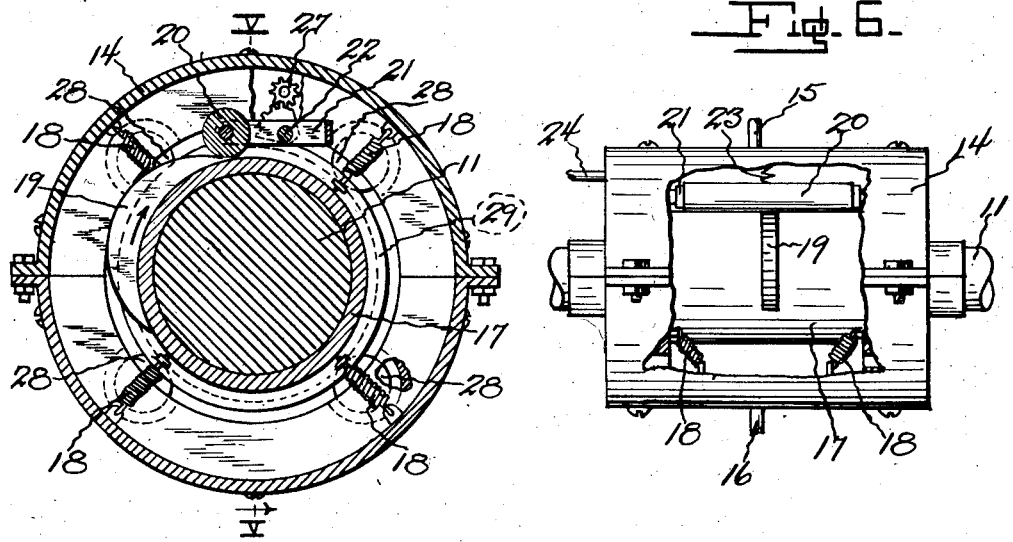
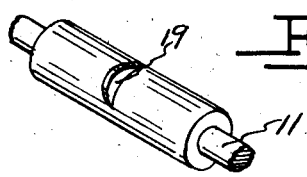
INVENTOR.
James B. Annis
BY
ATTORNEY.

March 29, 1927.
J. B. ANNIS
1,622,481
DEVICE FOR MEASURING THE LUBRICATING VALUE OF OIL
Filed Aug. 3, 1925  2 Sheets-Sheet 2
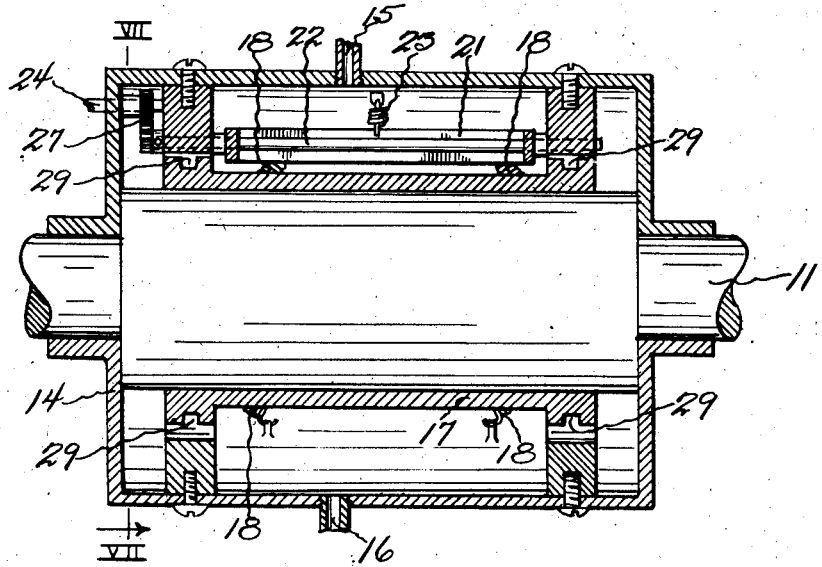
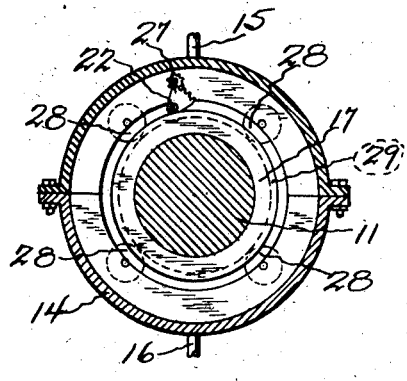
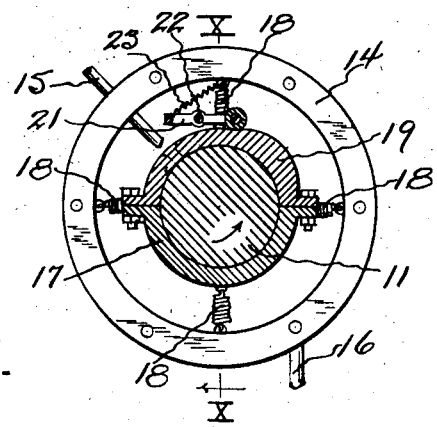
INVENTOR.
James B. Annis.
BY
ATTORNEY.

Patented Mar. 29, 1927.

1,622,481

UNITED STATES PATENT OFFICE.

JAMES B. ANNIS, OF KANSAS CITY, MISSOURI.

DEVICE FOR MEASURING THE LUBRICATING VALUE OF OIL.

Application filed August 3, 1925. Serial No. 47,853.

This invention relates to a device for measuring the lubricating value of oil or other lubricant commonly used in engines of various types.

It is realized that the device contemplated by this invention may be adapted to various uses, and applied to machines of wide and various kinds to determine the lubricating value of the oil being used in the lubricating system to supply the bearings and other friction surfaces.

The primary object of the present invention is the provision of a device which may be easily attached to any engine, machine or motor to indicate the lubricating value of the oil being used therein.

It is stressed at this time that this device may be made a permanent part of the engine, or may be used as a separate accessory or piece of equipment. In the event the same is made a part of the equipment carried by the automobile, the indicator, which is also contemplated by this invention may be carried on the instrument board and adapted to cut off the ignition circuit when the oil becomes bad enough to endanger the mechanism of the internal combustion engine.

Many minor objects of this invention dealing with the points of construction will be pointed out in the detailed specification referring to the accompanying drawings, which illustrate the preferred and one modified form of the invention. In the drawings:

Figure 1 is a fragmentary view of an internal combustion engine showing the relative position of the device and indicator when used in an automobile.

Fig. 2 is a broken face view of the indicator.

Fig. 3 is a combinational view showing a fragmentary section of the indicator, taken on line III—III of Fig. 2 as well as a diagrammatical view of the electrical current wiring.

Fig. 4 is an enlarged vertical cross section of the measuring device taken on line IV—IV of Fig. 1.

Fig. 5 is a longitudinal vertical central section of the device taken on line V—V of Fig. 4.

Fig. 6 is a side elevation of the device with a portion of the housing broken away.

Fig. 7 is another vertical cross section taken on line VII—VII of Fig. 5.

Fig. 8 is a perspective view of the shaft and cam surface, showing it entirely removed from the rest of the device.

Fig. 9 is a vertical central cross section of a modified form of the invention, and, Fig. 10 is a longitudinal vertical central section of the modified form of the device taken on line X—X of Fig. 9.

Referring at this time to the drawings in detail, wherein similar reference characters refer to like parts throughout the several views, the numeral 11 designates a shaft which is attached to any suitable part of an internal combustion engine 12. The shaft 11 is rotated by the particular part, and it is desired to make clear the fact that any motive power may be used to rotate shaft 11, but where the device is made a part of any engine, motor or the like, the oil of which is to be used and measured, it should be made a part thereof and interposed in the oil line so that the measuring device is the last bearing the oil passes through before returning to the reservoir or oil pump.

A housing 14 encases a portion of shaft 11, which may be enlarged as shown to provide a greater friction surface, and an oil inlet and outlet 15 and 16 respectively supply and carry off the lubricating element to be measured. The housing should be split in the well-known manner to afford easy assembling and proper gaskets and stuffing boxes, not here shown, provided to prevent the escape of the oil.

When the oil has entered housing 14, it reaches the friction surface formed between shaft 11 and a shaft engaging member 17, which is loosely though snugly mounted thereon and, through its lubricating properties, permits shaft 11 to rotate therein without turning member 17.

Member 17 is yieldably stabilized by any resilient means such as springs 18 which connect the same to housing 14. These springs 18 should be diametrically opposite, and four or more should be used. In the event the lubricating value of the oil is not high, it will be seen that the shaft 11 will have a tendency to "grab" or cause member 17 to rotate therewith. When this action takes place, the springs 18 yield and permit member 17 to carry a cam 19, which may be formed integrally therewith, around and upwardly to engage a roller 20. This roller 20 is pivotally mounted and carried by the free ends of a yoke 21 on a line parallel with the axis of shaft 11. Yoke 21 is, in turn rigidly mounted on a shaft 22 which is rotatably supported by housing 14, or some part rigid therewith.

A spring 23 maintains the roller in constant engagement with the outer surface of the cam, and as the roller rides thereover, shaft 22 is rotated to turn a flexible chain 24, which is operatively connected to pointer 25 of the indicator 26.

In some instances, the cam size may require the use of a train of gears 27 which will serve to "step up" the distance traveled by shaft 22. This will insure the proper movement of pointer 25.

In the preferred form, the guide to prevent end play, consists of a series of diametrically opposite rollers 28 in engagement with an annular groove 29, while in the modified form, the same means consists of inwardly turned flanges 30, integral with member 17.

When cam 19 raises roller 20 almost to the highest point on its surface, pointer 25 will indicate "change oil." If the driver disregards this warning, switch 31 will be opened by pin 32, carried by pointer 25 when roller 20 moves to the extreme highest point on cam 19, and the current supplying the primary circuit will be cut off. This action will stop the engine. A switch 33 is supplied, however, which may be closed by the driver to again allow the engine to be run. This warning and action gives the driver of the engine definite knowledge that he is using oil that is in a condition dangerous and harmful to his motor.

It is understood that many changes and modifications may be made in the construction of this invention without departing from the spirit thereof. It is desired to be limited, therefore, only by the scope of the appended claims.

What I claim is:

1. A device for measuring the lubricating value of oil comprising a housing having an oil inlet and an oil outlet, a rotatable shaft passing through said housing, a shaft-engaging member having a radially projecting cam within said housing, yieldable movement resisting means engaging said shaft engaging member and an indicating device having means operable by said cam.

2. A device for measuring the lubricating value of oil comprising a housing, a rotatable shaft therein, a shaft engaging member within said housing, an indicating device, means for operating said indicating device and including means formed on said shaft engaging member and means connecting said shaft engaging member to said housing for yieldably stabilizing the same.

3. A device for measuring the lubricating value of oil comprising a housing, a rotatable shaft passing therethrough, a shaft engaging member within said housing adapted to be actuated by said shaft when the same is rotated, yieldable stabilizers for said member carried by said housing within the same, an indicating device and means for operating said indicating device and including means formed on said shaft engaging member operable when the same is actuated by the shaft.

4. A device for measuring the lubricating value of oil comprising a housing, a rotatable shaft passing therethrough, a shaft engaging member within said housing, yieldable stabilizers for said members carried by said housing within the same, a visible indicator and means including a cooperating cam surface and cam engaging member operably interconnecting said shaft engaging member and said indicator.

5. A device for measuring the lubricating value of oil comprising a housing, a rotatable shaft therethrough, a shaft engaging member having a projecting cam surface within said housing, yieldable stabilizers for said member carried by said housing within the same, an indicator and an indicator actuating means having a cam surface engaging member within said housing.

6. A device for measuring the lubricating value of oil comprising a housing, a rotatable shaft therein, a shaft engaging member within said housing, yieldable stabilizers for said member carried within said housing, an indicator, guide means for said shaft engaging member adjacent each end thereof adapted to permit the member to move around said rotatable shaft and prevent its movement longitudinally thereof, a cam on said shaft engaging member and an indicator actuating means having an arm movable to indicate displacement of the shaft engaging member and operatively engaging the cam on said shaft engaging member.

In testimony whereof I hereunto affix my signature this 1st day of August, 1925.

JAMES B. ANNIS.